(12) United States Patent
Hirose

(10) Patent No.: US 7,512,334 B2
(45) Date of Patent: Mar. 31, 2009

(54) DUST EXCLUDING PACKING SHEET AND METHOD OF INTEGRATING DUST EXCLUDING SHEET

(75) Inventor: Katsuhiro Hirose, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 508 days.

(21) Appl. No.: 11/435,367

(22) Filed: May 16, 2006

(65) Prior Publication Data
US 2006/0275973 A1 Dec. 7, 2006

(30) Foreign Application Priority Data
May 16, 2005 (JP) ............................ P2005-142527

(51) Int. Cl.
*G03B 17/18* (2006.01)
(52) U.S. Cl. .................. 396/287; 396/373; 345/156; 348/794
(58) Field of Classification Search ............... 396/287, 396/296, 373, 382, 448; 345/156, 905; 348/794; 361/681
See application file for complete search history.

(56) References Cited

U.S. PATENT DOCUMENTS 5,400,160 A * 3/1995 Takahashi et al. ............ 349/60
RE36,018 E * 12/1998 Abe et al. .................. 396/382
7,405,777 B2 * 7/2008 Shimizu ..................... 349/58
2004/0021630 A1 * 2/2004 Lei et al. .................... 345/102

FOREIGN PATENT DOCUMENTS

| JP | 2002169477 A | * | 6/2002 |
| JP | 2004-120350 | | 4/2004 |
| JP | 2004-184671 | | 7/2004 |
| JP | 2006228523 A | * | 2/2005 |
| JP | 2008109495 A | * | 5/2008 |

OTHER PUBLICATIONS

Patent Abstracts of Japan, Publication No. 2004-120350, Publication Date: Apr. 15, 2004, 1 page.
English Patent Abstracts of JP2004120350 from esp@cenet, published Apr. 15, 2004, 1 page.
Patent Abstracts of Japan, Publication No. 2004:184671, Publication Date Jul. 2, 2004, 1 page.
English Patent Abstract of JP2004184671, from esp@cenet, published Jul. 2, 2004, 1 page.

* cited by examiner

*Primary Examiner*—Jay M Patidar
(74) *Attorney, Agent, or Firm*—Osha • Liang LLP

(57) ABSTRACT

A flexible sheet member having a first dust excluding packing and a first auxiliary piece is tackedly held by an exfoliating sheet by an adhering layer 8 at a back face thereof. When the first dust excluding packing is exfoliated from the exfoliating sheet, and the first auxiliary piece is exfoliated from the exfoliating sheet by following the first dust excluding packing 6. The first auxiliary piece is formed with a cut line. After pasting the first dust excluding packing to a cabinet, the first auxiliary piece is separated from the first dust excluding packing.

11 Claims, 5 Drawing Sheets

DUST EXCLUDING PACKING SHEET AND METHOD OF INTEGRATING DUST EXCLUDING SHEET

CROSS-REFERENCE TO RELATED APPLICATIONS

This application is based on and claims the benefit of priority from the prior Japanese Patent Application No. 2005-142527, filed on May 16, 2005; the entire contents of which are incorporated herein by reference.

TECHNICAL FIELD

The present invention relates to a dust excluding packing sheet including a dust excluding packing used for excluding dust of a display arranged at an opening for a monitor formed at a cabinet of, for example, a digital camera, a lens barrel arranged at an opening for a finder formed at the cabinet or the like. Further, the invention relates to a method of integrating a dust excluding packing to a cabinet which is carried out in integrating the dust excluding packing sheet to respective base edge portions of the opening for the monitor and the opening for the finder.

BACKGROUND

1. Description of Related Art

FIG. 8 is an outline outlook view of a digital camera. In the digital camera of the drawing, a cabinet 1 thereof includes an first opening 2 which a liquid crystal display (LCD) faces, and an second opening 3 which a lens barrel faces, and in taking an image, for example, an image displayed on the liquid crystal display is seen through the opening 2, further, an object of taking an image is seen through the opening 3.

FIG. 9 is a front view viewing a portion of forming the first opening 2 or the like from an inner side of the cabinet 1, FIG. 10 is a sectional in correspondence with a portion taken along a line X-X of FIG. 9, and FIG. 10 shows both of a liquid crystal display 4 and a lens barrel 5.

As is known by FIG. 10, a first dust excluding packing 6 substantially in a shape of a rectangular ring is interposed at a portion of overlapping a base edge portion 21 of the first opening 2 and the liquid crystal display 4 for preventing a situation in which there is a case in which dust at inside of the cabinet 1 invades a side of a display face 41 of the liquid crystal display 4 to adhere to deteriorate an image quality by the first dust excluding packing 6 and preventing also a situation in which there is a case in which outside dust invades the first opening 2 to adhere to the display face 41 of the liquid crystal display 4 to deteriorate the image quality by a transparent protecting plate 22 attached to the first opening 2. Further, a second dust excluding packing 7 substantially in a shape of a rectangular ring is interposed at a portion of overlapping a base edge portion 31 of the second opening 3 to prevent a situation in which dust at inside of the cabinet 1 is adhered to a peeping face 51 of the lens barrel 5 to fog the peeping face by the second dust excluding packing 7.

According to related arts, the structure of mounting LCD of a digital camera, there is proposed a technology of preventing dust from invading by restraining a clearance from being produced in accordance with warping a cabinet by devising a countermeasure of urging an LCD unit by a coil spring to thereby elastically press the cabinet when the LCD unit is brought into direct contact with the cabinet to be attached thereto (refer to, for example, JP-A-2004-120350).

Further, in a field of an optical apparatus, there is also proposed a technology of preventing leakage of light by arranging a resin having a high light blocking property at a surrounding of a light adjusting sensor or the like when an outward mounted cabinet of a camera is provided with a light transmitting property (refer to, for example, JP-A-2004-184671).

SUMMARY OF INVENTION

However, according to the digital camera explained in reference to FIG. 9 and FIG. 10, it is known that steps of integrating the first dust excluding packing 6 and the second dust excluding packing 7 are carried out while adhering dust to an opening end face 61 of the first dust excluding packing 6 and an opening end face 71 of the second dust excluding packing 7 and therefore, dust adhered to the opening end faces 61, 71 is adhered to the display face 41 of the liquid crystal display 4 to deteriorate an image quality, or adhered to the peeping face 51 of the lens barrel 5 to fog the peeping face after integrating the digital camera.

Further, although polyethylene foam which is comparatively tenacious and rich in a self holding property is used for the first dust excluding packing 6 and the second dust excluding packing 7 used in the digital camera explained in reference to FIG. 9 and FIG. 10, thereby, integrating operability (pasting operability) of the respective packings 6, 7 with respect to the cabinet 1 is promoted and therefore, comparatively excellent integrating operability is ensured for the packings 6, 7, as a countermeasure for reducing material cost of the digital camera, from a view point that the packings 6, 7 are comparatively expensive, it has been found that even when the same polyethylene foam is used for the first dust excluding packing 6 and the second dust excluding packing 7, it is preferable to use polyethylene foam of a lower grade.

According to JP-A-2004-120350, the dust excluding packing is not used. According to JP-A-2004-184671, leakage of light is prevented. It is not possible to achieve to resolve a problem of eliminating steps of integrating the first dust excluding packing 6 and the second dust excluding packing 7 while adhering dust to the opening end face 61 of the first dust excluding packing 6 and the opening end face 71 of the second dust excluding packing 7. There is a problem that the respective packings 6, 7 fabricated by polyethylene foam of the low grade are integrated with excellent operability.

The invention has been carried out under the above-described situation, and it is an object thereof to provide a dust excluding packing sheet and a method of integrating a dust excluding packing to a cabinet capable of eliminating a concern that steps of integrating the dust excluding packing is carried out while adhering dust to an opening end face thereof.

Further, it is an object of the invention to provide a dust excluding packing sheet and a method of integrating a dust excluding packing to a cabinet capable of integrating packings to a cabinet with excellent operability even when a first or a second one of the dust excluding packing is fabricated by using an inexpensive low grade material deficient in a self holding property.

According to an aspect of the invention, a flexible sheet member having a dust excluding packing and an auxiliary piece installed to be connected to the dust excluding packing is made to be able to be separated into the dust excluding packing and the auxiliary piece by a cut line, an adhering layer held by a back face of the sheet member by crossing over the cut line overlaps an exfoliating sheet and the sheet member is tackedly held by the exfoliating sheet, and when one of the dust excluding packing or the auxiliary piece is exfoliated from the exfoliating sheet, other thereof is exfoliated from the exfoliating sheet by following the one by an adhering property of the adhering layer.

According to the above-aspect, before exfoliating and after exfoliating the dust excluding packing from the exfoliating sheet, the auxiliary piece overlaps an end face of the dust excluding packing to prevent dust from being adhered to the end face of the dust excluding packing. Therefore, when the dust excluding packing is integrated by a procedure of pasting the dust excluding packing to the cabinet and thereafter separating the auxiliary piece from the dust excluding packing, it is not permitted to bring about a situation in which the dust excluding packing is integrated to the cabinet while adhering dust to the end face of the dust excluding packing. Further, when the dust excluding packing is exfoliated from the exfoliating sheet, the auxiliary piece stays to be installed to be connected to the dust excluding packing by way of the cut line by operation of the adhering layer and therefore, the auxiliary piece achieves an operation of promoting self holding performance of the dust excluding packing. Therefore, even when the dust excluding packing is fabricated by using an inexpensive material deficient in the self holding performance, a performance of handling the dust excluding packing is promoted, and a series of integrating steps of exfoliating the dust excluding packing from the exfoliating sheet and pasting the dust excluding sheet to the cabinet can excellently be carried out in a short period of time.

According to another aspect of the invention, the dust excluding packing may be formed in a ring-like shape and the auxiliary piece is disposed on an inner side of the dust excluding packing, according thereto, the dust excluding packing can be used as the first dust excluding packing or the second dust excluding packing of the digital camera explained above.

According to the above-aspects, the dust excluding packing sheet can adopt a constitution in which the sheet member includes a first one and a second one of two dust excluding packings having different sizes and a first one and a second one of auxiliary pieces individually installed to be connected to the respective dust excluding packings, the first auxiliary piece installed to be connected to the first dust excluding packing is formed in a ring-like shape, and the second dust excluding packing and the second auxiliary piece installed to be connected to the second dust excluding packing are arranged to be spaced apart from the first auxiliary piece with a gap therebetween at a region surrounded by the first auxiliary piece. According thereto, the first dust excluding packing can be used as the first dust excluding packing 6 or the second dust excluding packing 7 for being integrated to the base edge portion 21 of the opening 2 for a monitor and the base edge portion 31 of the opening 3 for a finder of the digital camera explained above. Further, two kinds of dust excluding packings of the first dust excluding packing and the second dust excluding packing can be cut out by only using a sheet member having a size requested in the first dust excluding packing and therefore, an advantage of promoting yield of a material and reducing an abandoned material is achieved. Furthermore, an advantage of facilitating to exfoliate the first dust excluding packing and the second dust excluding packing individually from the exfoliating sheet can be achieved although the adhering layer is held by the sheet member by constructing the constitution of arranging the second dust excluding packing and the second auxiliary piece installed to be connected to the second dust excluding packing to be spaced apart from the first auxiliary piece with a gap therebetween at a region surrounded by the first auxiliary piece.

According to another aspect of the invention, a cut line of dividing the auxiliary piece may be formed by crossing the auxiliary piece at the sheet member. When the auxiliary piece is separated from the dust excluding sheet after pasting the dust excluding packing to the cabinet, the auxiliary piece can be separated to remove from the dust excluding packing by carrying out an operation of successively tearing off the auxiliary piece by constituting an onset by a portion of forming the cut line and therefore, thereby, a situation of exfoliating the dust excluding packing pasted to the cabinet in removing the auxiliary piece can be prevented from being brought about. The operation is similarly achieved also when the first auxiliary piece is formed with a cut line of dividing the first auxiliary piece by crossing the first auxiliary piece, or the second auxiliary piece is formed with a break line comprising a cut line extended in a direction of crossing the second auxiliary piece. Further, particularly when there is adopted a constitution that the break line in a shape of a folded to bend line with regard to the second auxiliary piece, there is achieved an advantage of facilitating to separate the second auxiliary piece having a size smaller than that of the first auxiliary piece from the second dust excluding packing.

According to another aspect of the invention, the flexible sheet member includes the dust excluding packing and the auxiliary piece installed to be connected to the dust excluding packing. The flexible sheet can be separated into the dust excluding packing and the auxiliary piece by the cut line, the adhering layer held by the back face of the sheet member by crossing over the cut line overlaps the exfoliating sheet and the sheet member is tackedly held by the exfoliating sheet, when one of the dust excluding packing or the auxiliary piece is exfoliated from the exfoliating sheet, other thereof is exfoliated from the exfoliating sheet by following the one by an adhering property of the adhering layer, the dust excluding packing is divided into the first dust excluding packing in a ring-like shape interposed at the portion of overlapping the base edge portion of the opening for a monitor and the display facing the opening formed at the cabinet of the digital camera and the second dust excluding packing in a ring-like shape interposed at a portion of overlapping the base edge portion of the opening for a finder and the lens barrel facing the opening formed at the cabinet, further, the auxiliary piece is divided into the first auxiliary piece in a ring-like shape installed to be connected to the first dust excluding packing and disposed on an inner side of the first dust excluding packing, and the second auxiliary piece installed to be connected to the second dust excluding packing and disposed on an inner side of the second dust excluding packing, the second dust excluding packing is arranged to be spaced apart from the first auxiliary piece with a space therebetween at a region surrounded by the first auxiliary piece, the first auxiliary piece is formed with the cut line of dividing the first auxiliary piece by crossing the first auxiliary piece, and the second auxiliary piece is formed with the break line comprising the cut line in the shape of the folded to bend line extended in the direction of crossing the second auxiliary piece. The first dust excluding packing will be explained in details in reference to an embodiment, mentioned later.

According to another aspect of the invention, a method of integrating a dust excluding packing to a cabinet includes; preparing the dust excluding packing sheet; exfoliating the flexible sheet member from the exfoliating sheet; pasting the flexible sheet member to at least one of the base edge portion of the first opening and the base edge portion of the second opening; separating and removing the auxiliary piece from the dust excluding packing, so that only the dust excluding packing is left; and pasting at least one of the display and the lens barrel to the dust excluding packing.

The first dust excluding packing of the dust excluding packing sheet is exfoliated from the exfoliating sheet along with the first auxiliary piece to be pasted to the base edge portion of the opening for a monitor formed at the cabinet of the digital camera. Thereafter, only the first dust excluding packing is left and separated to remove the first auxiliary piece from the first dust excluding packing.

The display is pasted to the first dust excluding packing. the second dust excluding packing of the dust excluding packing sheet is exfoliated from the exfoliating sheet along with the second auxiliary piece to be pasted to the base edge portion of the opening for a finder formed at the cabinet of the digital camera. Thereafter, only the second dust excluding packing is left by separating to remove the second auxiliary piece from the second dust excluding packing and pasting the lens barrel to the second dust excluding packing.

Further, when the first dust excluding packing of the dust excluding packing sheet is exfoliated from the exfoliating sheet along with the first auxiliary piece to be pasted on the base edge portion of the opening for a monitor formed at the cabinet of the digital camera. Only the first dust excluding packing is left by separating to remove the first auxiliary piece from the first dust excluding packing when an operation of successively tearing off the first auxiliary piece in a peripheral direction by forming the cut line of the first auxiliary piece. The display is pasted to the first dust excluding packing, and a step of exfoliating the second dust excluding packing of the dust excluding packing sheet from the exfoliating sheet along with the second auxiliary piece to be pasted to the base edge portion of the opening for a finder formed at the cabinet of the digital camera, thereafter, leaving only the second dust excluding packing by separating to remove the second auxiliary piece from the second dust excluding packing by carrying out an operation of successively tearing off the second auxiliary piece in a peripheral direction by constituting an onset by the portion of forming the break line of the second auxiliary piece, and thereafter, pasting the lens barrel to the second dust excluding packing.

According to the method of integrating the dust excluding packing to the cabinet, there are achieved an operation of eliminating a concern of carrying out the step of integrating the dust excluding packing to the cabinet while adhering dust to the end face of the dust excluding packing, and an operation of enabling to integrate the dust excluding packing to the cabinet with excellent operability even when the dust excluding packing is fabricated by using an inexpensive low grade material deficient in self holding performance.

[Advantage of the Invention]

As described above, according to the dust excluding packing sheet and the method of integrating the dust excluding packing to the cabinet according to the invention, there is not the concern of carrying out the step of integrating the dust excluding packing to the cabinet while adhering dust to the end face of the dust excluding packing and therefore, in the digital camera or the like, a situation that the image quality is deteriorated by adhering the dust to the display face of the liquid crystal display, or a situation of adhering dust to the peeping face of the lens barrel to fog the peeping face is prevented beforehand. Therefore, a way of use of the digital camera for a user is promoted.

According to the dust excluding packing sheet and the method of integrating the dust excluding packing to the cabinet according to the invention, even when the dust excluding packing is fabricated by using an inexpensive low grade material deficient in self holding performance, the dust excluding packing can be integrated to the cabinet with excellent operability and therefore, a reduction in a price of the digital camera or the like is facilitated to be achieved by restraining a material cost or a fabrication cost of the dust excluding packing.

DESCRIPTION OF THE EMBODIMENTS

Figure 1:
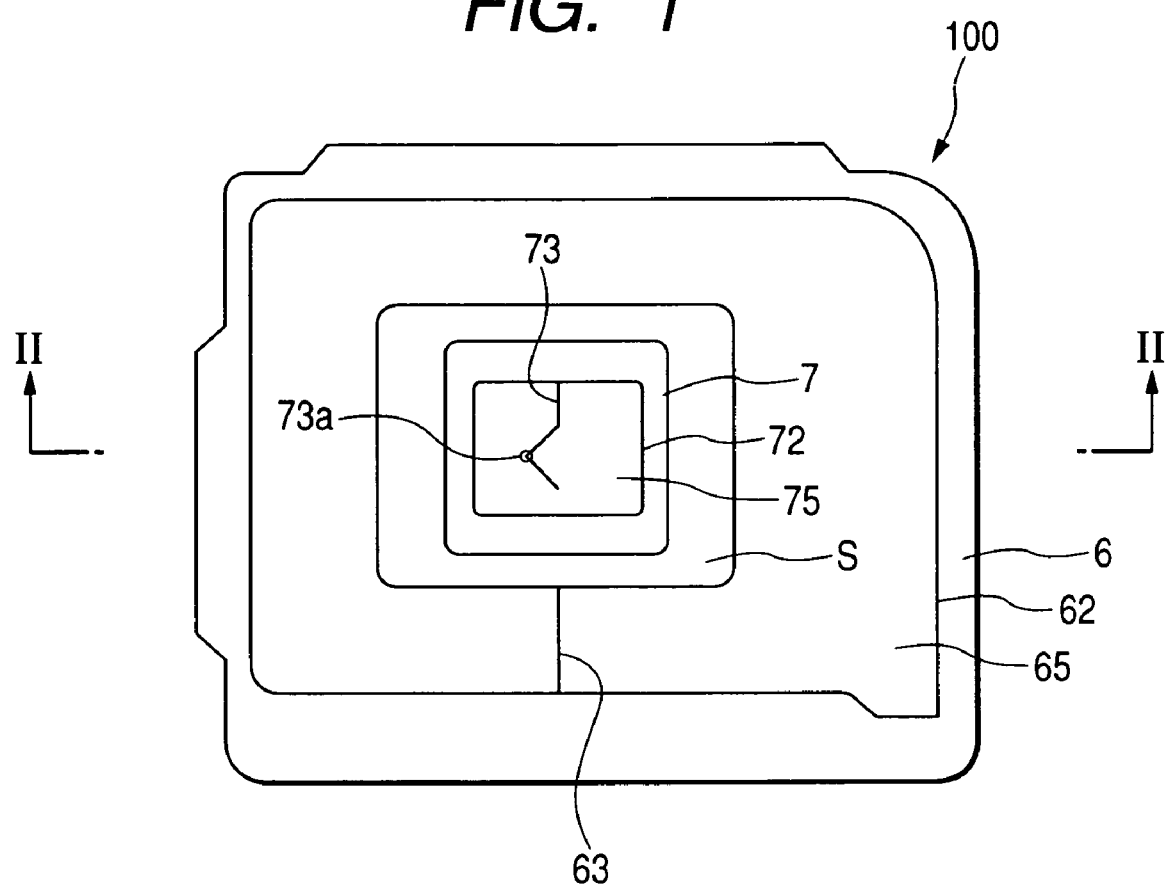
FIG. 1 is a front view of a dust excluding packing sheet according to an embodiment of the invention.
Figure 2:
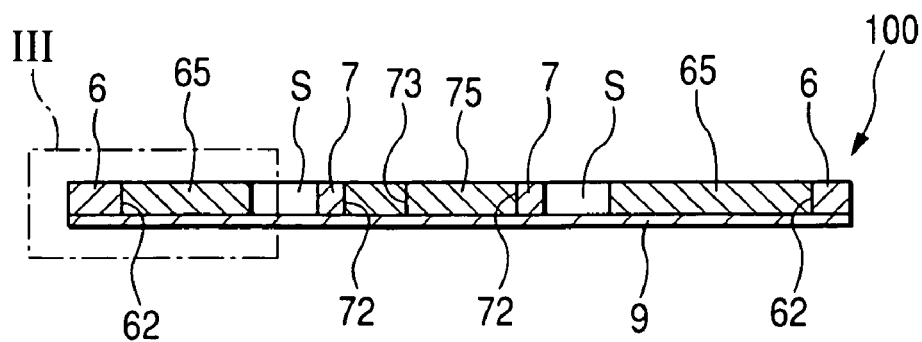
FIG. 2 is a sectional view taken along a line II-II of FIG. 1.
Figure 3:
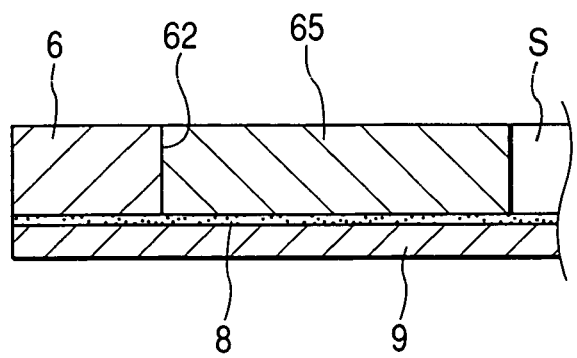
FIG. 3 is a view enlarging portion III of FIG. 2.
Figure 4:
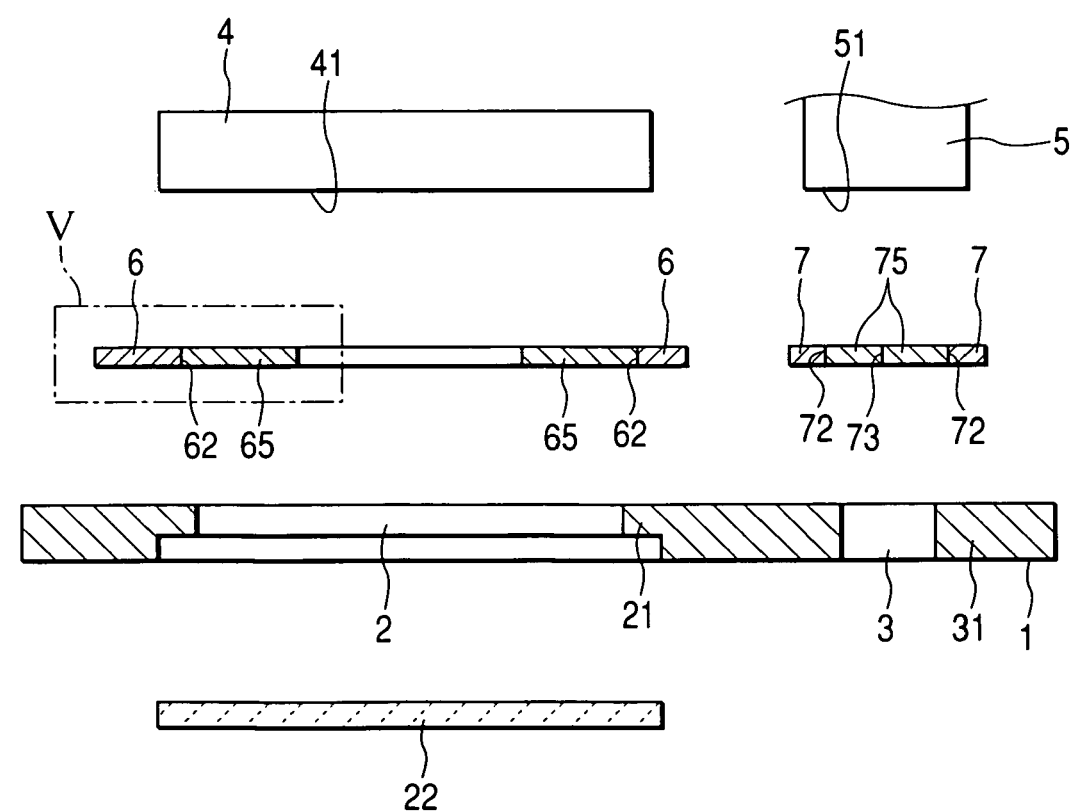
FIG. 4 is an explanatory view for explaining a procedure of integrating a dust excluding packing to a cabinet.
Figure 5:
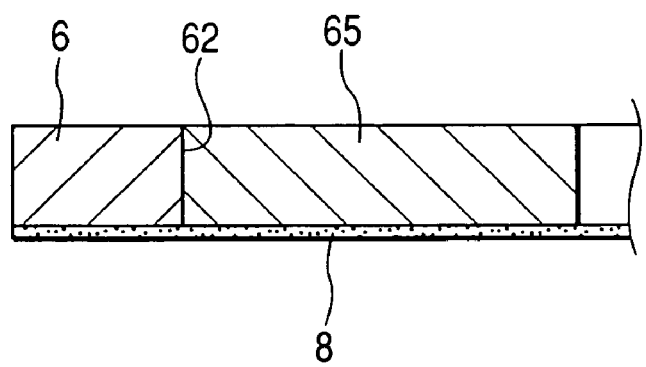
FIG. 5 is a view enlarging portion V of FIG. 4 for explaining an adhering layer.
Figure 6:
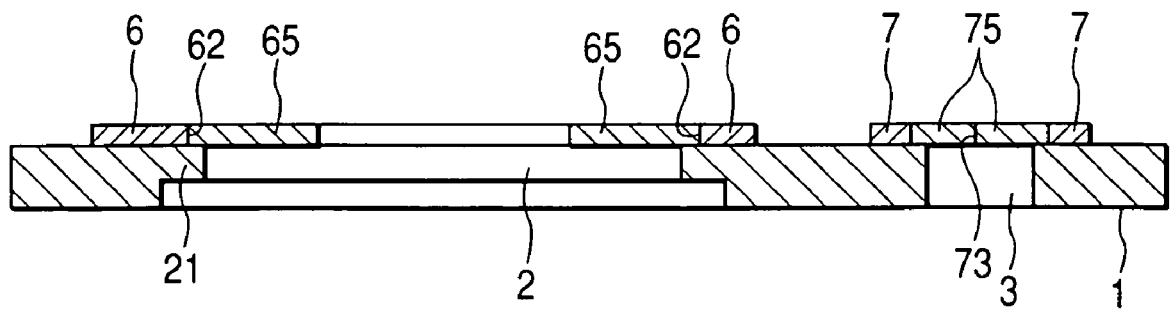
FIG. 6 is an explanatory view of an initial stage of integrating the dust excluding packing.
Figure 7:
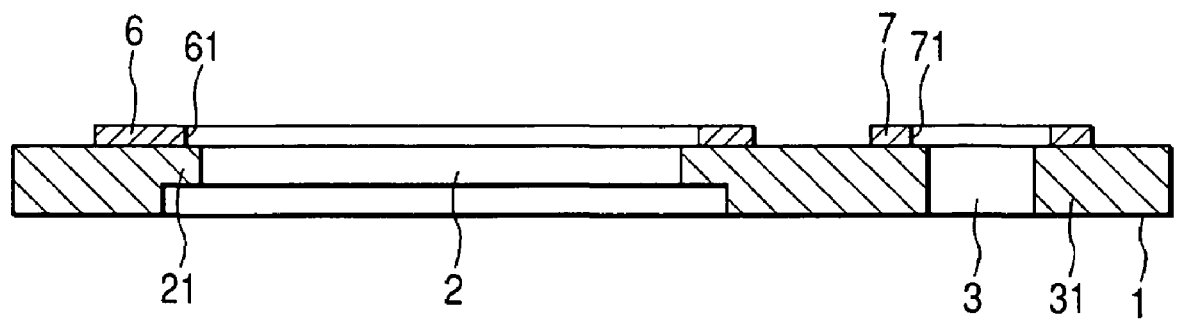
FIG. 7 is an explanatory view at a time point of finishing the integration.
Figure 8:
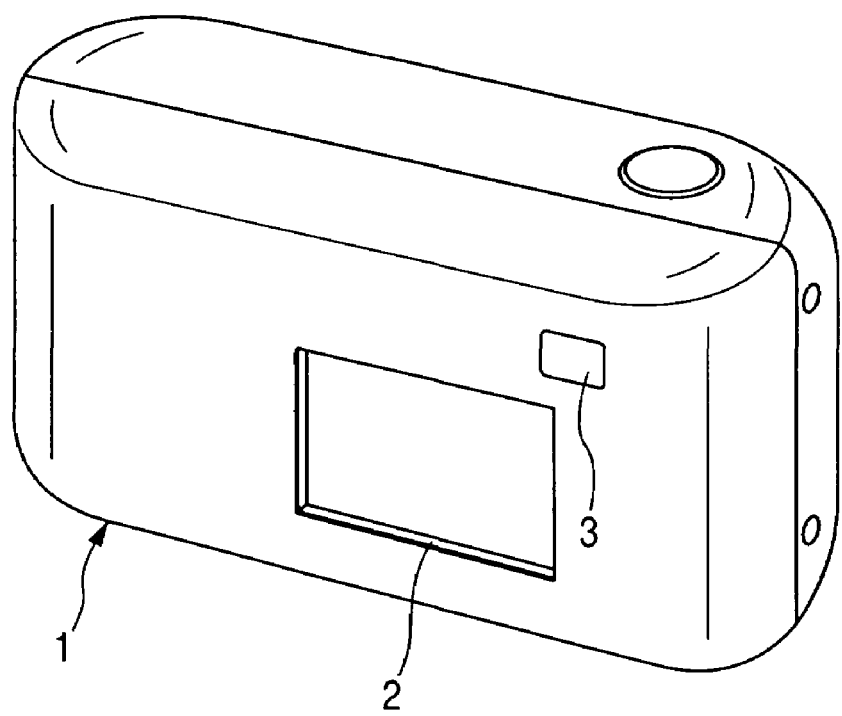
FIG. 8 is an outline outlook view of a digital camera.
Figure 9:
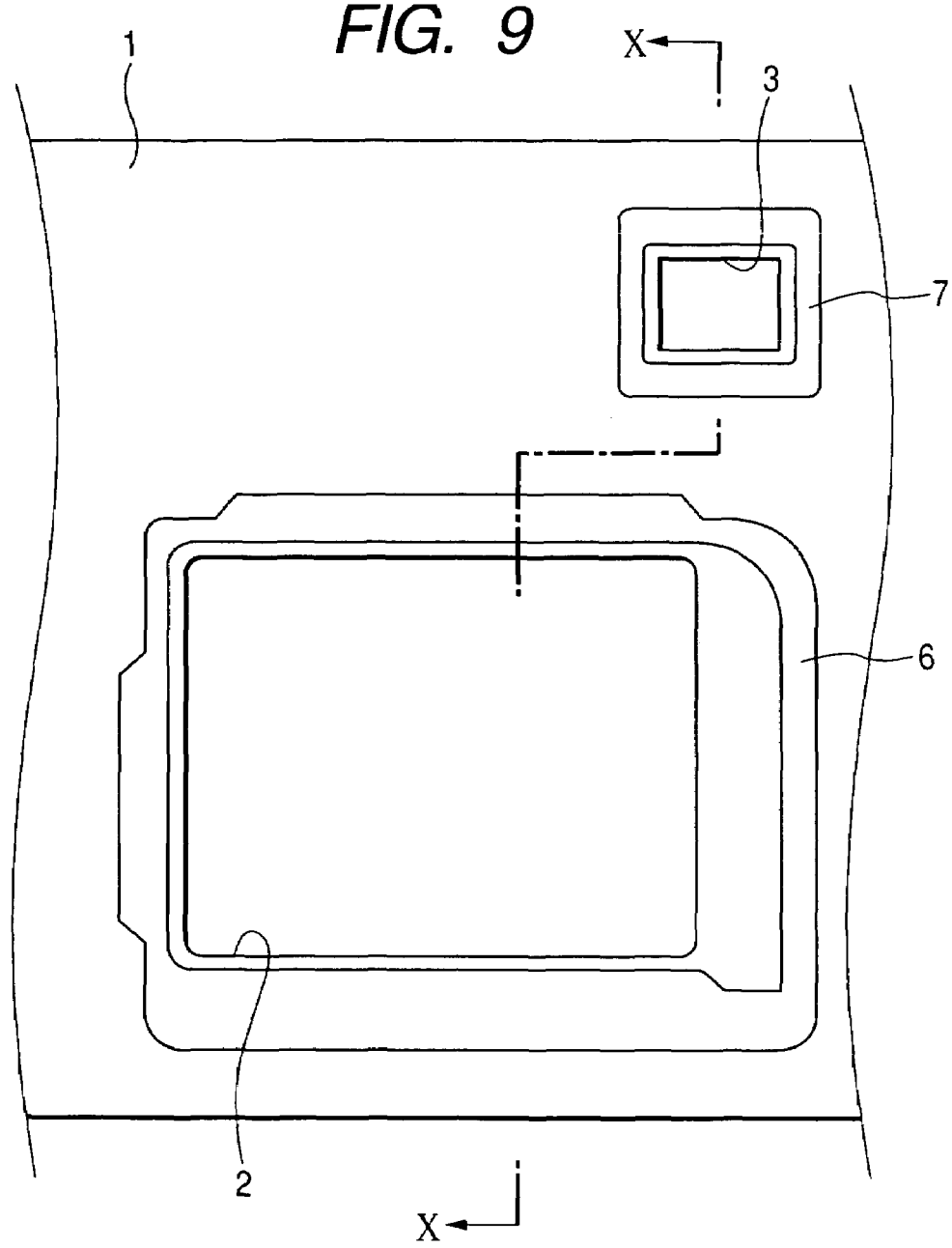
FIG. 9 is a front view viewing a portion of forming an opening for a monitor and the like from an inner side of a cabinet.
Figure 10:
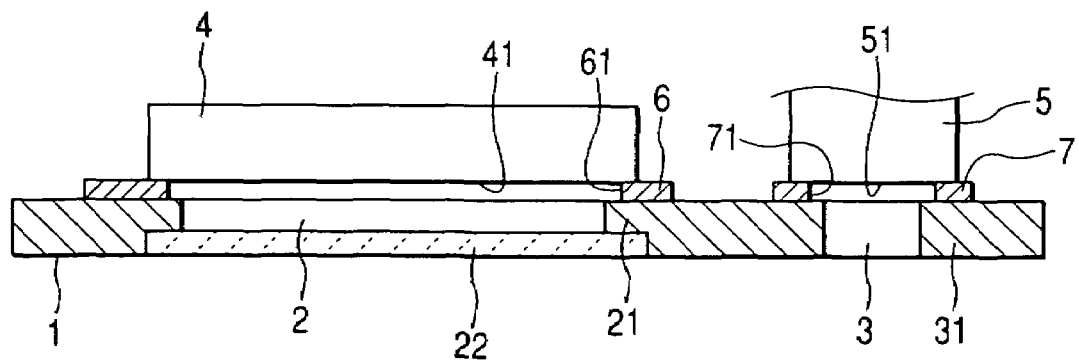
FIG. 10 is a sectional view in correspondence with a portion along a line X-X of FIG. 9.

FIG. 1 is a front view of a dust excluding packing sheet 100 according to an embodiment. FIG. 2 is a sectional view taken along a line II-II of FIG. 1. FIG. 3 is a view enlarging portion III of FIG. 2. FIG. 4 is an explanatory view for explaining a procedure of integrating a dust excluding packing to a cabinet 1. FIG. 5 is a view enlarging portion V of FIG. 4 for explaining an adhering layer 8. FIG. 6 is an explanatory view of an initial stage of integrating the dust excluding packing. FIG. 7 is an explanatory view at a time point of finishing the integration.

The dust excluding packing sheet 100 shown in FIG. 1 through FIG. 3 includes a first dust excluding packing 6 and a second dust excluding packing 7 integrated to the base edge portion 21 of a first opening 2 and the base edge portion 31 of an second opening 3. The respective dust excluding packings 6, 7 are formed in a shape of the rectangular ring. The respective dust excluding packings 6,7 are installed to be connected with a first auxiliary piece 65 and a second auxiliary piece 75. The first dust excluding packing 6 is formed to be larger than the second dust excluding packing 7. The first dust excluding packing 6 and the first auxiliary piece 65 substantially in the shape of the rectangular ring installed to be connected to an inner side thereof are partitioned by a cut line 62 formed substantially in a shape of a rectangular ring. One portion of the first auxiliary piece 65 is formed with a cut line 63 crossing to divide the first auxiliary piece 65. As shown by FIG. 3, the adhering layer 8 crossing over the cut line 62 is held by a total of back faces of both of the first dust excluding packing 6 and the first auxiliary piece 65. Therefore, so far as the first auxiliary piece 65 is intentionally separated from the first dust excluding packing 6 at a portion of forming the cut line 62, The first auxiliary piece 65 keeps to be adhered to the first dust excluding packing 6 by the adhering layer 8. In contrast thereto, the second dust excluding packing 7 is provided with a size capable of being arranged to be spaced apart from the first auxiliary piece 65 with a gap therebetween at a region of being surrounded by the first auxiliary piece 65. The second dust excluding packing 7 is also installed to be connected with the second auxiliary piece 75 substantially in a rectangular shape on an inner side thereof, the both members are partitioned by a cut line 72 formed substantially by a shape of a rectangular ring, and one portion of the second auxiliary piece 75 is formed with a break line 73 comprising a cut line extended in a direction of crossing the second auxiliary piece 75. In the illustrated example, the break line 73 is formed by a shape of a folded to bend line folded to bend in a V-like shape. Notation 73a designates a folded to bend portion of the break line 73. Further, the adhering layer 8 crossing over the cut line 72 is held by total of back faces of both of the second dust excluding packing 7 and the second auxiliary piece 75 similar to the explanation explained in reference to FIG. 3. Therefore, so far as the second auxiliary piece 75 is intentionally separated from the second dust excluding packing 7 at a portion of forming the cut line 72, the second auxiliary piece 75 keeps to be adhered to the second dust excluding packing 7 by the adhering layer 8.

As shown by FIG. 2, the first dust excluding packing 6 and the first auxiliary piece 65 as well as the second dust excluding packing 7 and the second auxiliary piece 75 are tackedly held by an exfoliating sheet in a state of being adhered thereto by overlapping the adhering layer 8 held by the back faces to one sheet of the exfoliating sheet 9, and the second dust excluding packing 7 is arranged to be spaced apart from the first auxiliary piece 65 with a gap S therebetween at a region surrounded by the first auxiliary piece 65. The dust excluding packing sheet 100 can easily be fabricated by adhering one sheet of a sheet member having the adhering layer 8 to the exfoliating sheet 9 by way of the adhering layer 8, forming the cut lines 62, 63, 72 and the break line 73 under the state, exfoliating a predetermined portion of the sheet member from the exfoliating sheet 9 substantially in a shape of a rectangular ring and constituting the gap S by an exfoliated remaining portion. Further, the dust excluding packing sheet 100 can inexpensively be obtained by using an inexpensive and flexible material, that is, low grade sheet-like polyethylene foam for the sheet member.

Next, an explanation will be given of a procedure or a method of integrating the first dust excluding packing 6 and the second dust excluding packing 7 formed by the flexible sheet member of the dust excluding packing sheet 100 explained in reference to FIG. 1 through FIG. 3 to the base edge portion 21 of the first opening 2 and the base edge portion 31 of the second opening 3 of the cabinet 1 of the electric apparatus.

At first stage, there is carried out a step of exfoliating the first dust excluding packing 6 and the second dust excluding packing 7 of the dust excluding packing sheet 100 shown in FIG. 1 or FIG. 2 from the exfoliating sheet 9. At the step, when the first dust excluding packing 6 is exfoliated, the first dust excluding packing 6 is torn off while being exfoliated from the exfoliating sheet 9 by grabbing an end of one of the first dust excluding packing 6 and the first auxiliary piece 65, for example, the first dust excluding packing 6 by a jig of a tweezer or the like. When carried out in this way, as shown by FIG. 5, since the adhering layer 8 is formed to cross over the cut line 62, also the first auxiliary piece 65 is exfoliated from the exfoliating sheet 8 by following the first dust excluding packing 6 by adhering operation of the adhering layer 8. Conversely, even when the first auxiliary piece 65 is torn off while being exfoliated from the exfoliating sheet 8 by grabbing the end of the first auxiliary piece 65 by the jig, also the first dust excluding packing 6 is exfoliated from the exfoliating sheet 8 by following the first auxiliary piece 65 by the adhering operation of the adhering layer 8. Similarly, also in exfoliating the second dust excluding packing 7, the second dust excluding packing 7 is torn off while being exfoliated from the exfoliating sheet 9 by grabbing an end of one of the second dust excluding packing 7 and the second auxiliary piece 75, for example, the second dust excluding packing 7 by the jig of the tweezer or the like. When carried out in this way, since the adhering layer 8 is formed to cross over the cut line 72, also the second auxiliary piece 75 is exfoliated from the exfoliating sheet 98 by following the second dust excluding packing 7 by way of the adhering layer 8, conversely, when the second auxiliary piece 75 is torn off by being exfoliated from the exfoliating sheet 9 by grabbing the end of the second auxiliary piece 75 by the jig, also the second dust excluding packing 7 is exfoliated from the exfoliating sheet 8 by following the second auxiliary piece 75 by the adhering operation of the adhering layer 8. In this case, the first dust excluding packing 6 may be exfoliated prior to the second dust excluding packing 7, the second dust excluding packing 7 may be exfoliated prior to the first dust excluding packing 6, even when one thereof is exfoliated prior to other thereof, since the first auxiliary piece 65 and the second dust excluding packing 7 are separated from each other by the gap S, both of the first dust excluding packing 6 and the second dust excluding packing 7 are not exfoliated together. Therefore, there is not brought about situation in which the both are exfoliated together to hamper handling thereafter. Further, when the second dust excluding packing 7 is exfoliated prior to the first dust excluding packing 6, there is achieved an advantage of capable of easily grabbing only the second dust excluding packing 7 by the jig by utilizing the gap S.

The first auxiliary piece 65 is adhered to be installed to be connected to the first dust excluding packing 6 exfoliated from the exfoliating sheet 9 by the adhering layer 9, the second auxiliary piece 65 is adhered to be installed to be connected to the second dust excluding packing 7 by way of the adhering layer 8 and therefore, the first auxiliary piece 65 reinforces the first dust excluding packing 6 to serve to promote self holding performance, and the second auxiliary piece 75 reinforces the second dust excluding packing 7 to serve to promote self holding performance. Therefore, even when a flexible untenacious and inexpensive material, for example, low grade sheet-like polyethylene foam is used for the sheet member constituting the material of the first dust excluding packing 6 and the second dust excluding packing 7, the first dust excluding packing 6 and the second dust excluding packing 7 can easily be handled without wrinkling therein.

As shown by FIG. 6, the first dust excluding packing 6 is pasted to the base edge portion 21 of the first opening 2 while being adhered with the first auxiliary piece 65, thereafter, the first auxiliary piece 65 is separated from the first dust excluding packing 6 at the portion of forming the cut line 62 by grabbing the first auxiliary piece 65 by the jig of the tweezer or the like to remove as shown by FIG. 7, successively, the liquid crystal display 4 shown in FIG. 4 is pasted to the first dust excluding packing 6 and the transparent protecting plate 22 is attached to the first opening 2. The first dust excluding packing 6 is integrated to the base edge portion 21 of the first opening 2 while the opening end face 61 shown in FIG. 7 is being covered by the first auxiliary piece 65 overlapped thereto. There is not a concern that the liquid crystal display 4 is pasted to the first dust excluding packing 6 in which dust is adhered to the opening end face 61, or the protecting plate 22 is attached to the opening 2 for a monitor. Further, when the first auxiliary piece 65 is separated from the first dust excluding packing 6, it is possible to carry out an operation of grabbing the portion of forming the cut line 62 of the first auxiliary piece 65 by the jig, and successively tearing off the first auxiliary piece 65 in a peripheral direction by constituting an onset by the portion and therefore, thereby, there is not brought about a situation in which the first dust excluding packing 6 is accidentally torn off from the cabinet 1.

After removing or before removing the first auxiliary piece 65, as shown by FIG. 6, the second dust excluding packing 7 is pasted to the base edge portion 31 of the second opening 3 while being adhered with the second auxiliary piece 75, thereafter, the second auxiliary piece 75 is separated from the second dust excluding packing 7 at the portion of forming the cut line 72 by grabbing the second auxiliary piece 75 by the jig of the tweezer or the like to remove as shown by FIG. 7, successively, the lens barrel 5 shown in FIG. 4 is pasted to the second dust excluding packing 7. When carried out in this way, the second dust excluding packing 7 is integrated to the base edge portion 31 of the second opening while the opening end face 71 shown in FIG. 7 is being covered by the second auxiliary piece 75 overlapped thereto and therefore, there is not a concern that the lens barrel 5 is pasted to the second dust excluding packing 7 in which the opening end face 71 is adhered with dust. Further, when the second auxiliary piece 75 is separated from the second dust excluding packing 7, it is possible to carry out an operation of grabbing the portion of forming the break line 73 of the second auxiliary piece 75 by the jig and successively tearing off the second auxiliary piece 75 in a peripheral direction by constituting an onset by the portion and therefore, thereby, there is not brought about a situation in which the second dust excluding packing 7 is accidentally torn off from the cabinet 1. Particularly, according to the embodiment, the break line 73 is provided with the folded to bend portion 73a in the V-like shape and therefore, there is achieved an advantage that the folded to bend portion 73a is easy to be grabbed by the jig.

When the first dust excluding packing 6 and the second dust excluding packing 7 are integrated as described above, the first dust excluding packing 6 is interposed at the portion of overlapping the cabinet 1 and the liquid crystal display 4, the second dust excluding packing 7 is interposed at the portion of overlapping the cabinet 1 and the lens barrel 5, and the opening end faces 61, 71 are not adhered with dust. Therefore, it is difficult to bring about a situation in which dust is adhered to the display face 41 of the liquid crystal display 4 to deteriorate image quality, or a situation in which dust is adhered to the peeping face 51 of the lens barrel 5 to fog the peeping face.

The dust excluding packing sheet according to the embodiment can be applied to any electrical apparatus having a display portion. (For example, mobile voice reproducing apparatus, digital video camera and digital camera.)

Although according to the embodiment, an explanation has been given of the example of integrating two kinds of the dust excluding packings of the first dust excluding packing 6 and the second dust excluding packing 7 to the cabinet 1 of the digital camera, it is also possible to provide one kind of a dust excluding packing to a dust excluding packing sheet and integrate the dust excluding packing to an electric apparatus to achieve dust excluding operation.

What is claimed is:

1. A dust excluding packing sheet comprising:
   a flexible sheet member comprising;
   a dust excluding packing;
   an auxiliary piece installed to be connected to the dust excluding packing, wherein a cut line can separate the flexible sheet member into the dust excluding packing and the auxiliary piece; and
   an adhering layer held by a back face of the sheet member, the adhering layer crossing over the cut line of the flexible sheet, the adhering layer overlapping an exfoliating sheet so that the flexible sheet member can be temporarily held by the exfoliating sheet,
   wherein, when one of the dust excluding packing and the auxiliary piece is exfoliated from the exfoliating sheet, the other one is exfoliated from the exfoliating sheet by following the one by an adhering property of the adhering layer,
   wherein the dust excluding packing is divided into a first dust excluding packing and a second dust excluding packing,
   wherein the first dust excluding packing having a ring-like shape is interposed at a portion of overlapping a base edge portion of an first opening and a display facing the first opening formed at a cabinet of an electrical apparatus, and
   wherein the second dust excluding packing having a ring-like shape is interposed at a portion of overlapping a base edge portion of an second opening and a lens barrel facing the second opening, which are formed at the cabinet of the electrical apparatus,
   wherein the auxiliary piece is divided into a first auxiliary piece and a second auxiliary piece,
   wherein the first auxiliary piece having a ring-like shape is installed to be connected to the first dust excluding packing,
   wherein the first auxiliary piece is disposed on an inner side of the first dust excluding packing,
   wherein the second auxiliary piece is installed to be connected to the second dust excluding packing,
   wherein the second auxiliary piece is disposed on an inner side of the second dust excluding packing,
   wherein the second dust excluding packing is arranged to be apart from the first auxiliary piece with a gap therebetween at a region surrounded by the first auxiliary piece,
   wherein the first auxiliary piece has a cut line which divide the first auxiliary piece by crossing the first auxiliary piece, and
   wherein the second auxiliary piece has a break line comprising a cut line in a shape of a folded to bend line extended in a direction of crossing the second auxiliary piece.

2. A method of integrating a dust excluding packing to a cabinet, comprising:
   preparing a dust excluding packing sheet according claim 1,
   exfoliating the first dust excluding packing from the exfoliating sheet along with the first auxiliary piece to paste to the base edge portion of the first opening,
   successively tearing off the first auxiliary piece in a circumferential direction thereof from a portion of forming the cut line thereof, so that only the first dust excluding packing is left by separating and removing the first auxiliary piece from the first dust excluding packing;
   pasting a display to the first dust excluding packing;
   exfoliating the second dust excluding packing from the exfoliating sheet along with the second auxiliary piece;
   pasting the second dust excluding packing to the base edge portion of the second opening;
   successively tearing off the second auxiliary piece in a peripheral direction thereof from a portion of forming the break line of the second auxiliary piece, so that only the second dust excluding packing is left by separating and removing the second auxiliary piece from the second dust excluding packing; and pasting the lens barrel to the second dust excluding packing.

3. A dust excluding packing sheet comprising:

a flexible sheet member comprising;

a dust excluding packing;

an auxiliary piece installed to be connected to the dust excluding packing, wherein a cut line can separate the flexible sheet member into the dust excluding packing and the auxiliary piece; and an adhering layer held by a back face of the sheet member, the adhering layer crossing over the cut line of the flexible sheet, the adhering layer overlapping an exfoliating sheet so that the flexible sheet member can be temporarily held by the exfoliating sheet, wherein, when one of the dust excluding packing and the auxiliary piece is exfoliated from the exfoliating sheet, the other one is exfoliated from the exfoliating sheet by following the one by an adhering property of the adhering layer.

4. The dust excluding packing sheet according to claim 3, wherein the dust excluding packing is formed in a ring-like shape, and wherein the auxiliary piece is disposed on an inner side of the dust excluding packing.

5. The dust excluding packing sheet according to claim 4, wherein the dust excluding packing comprising:

two dust excluding packings, each having a different size and having a first auxiliary piece and a second auxiliary piece which are separately installed to be connected to the respective dust excluding packings, wherein the first auxiliary piece installed to be connected to one of the two dust excluding packings is formed in a ring-like shape, wherein the other one of the two dust excluding packings and the second auxiliary piece installed to be connected to the second dust excluding packing are arranged to be apart from the first auxiliary piece with a gap therebetween at a region surrounded by the first auxiliary piece.

6. The dust excluding packing sheet according to claim 5, wherein the first auxiliary piece is formed with a cut line of crossing the first auxiliary piece to divide the first auxiliary piece.

7. The dust excluding packing sheet according to claim 6, wherein the second auxiliary piece is formed with a break line comprising a cut line extended in a direction of crossing the second auxiliary piece.

8. The dust excluding packing sheet according to claim 7, wherein the break line is formed in a shape of a folded to bend line.

9. The dust excluding packing sheet according to claim 3, wherein the sheet member is formed with a cut line of crossing the auxiliary piece to divide the auxiliary piece.

10. A method of integrating a dust excluding packing to a cabinet, comprising:

preparing the dust excluding packing sheet according to claim 3;

exfoliating the flexible sheet member from the exfoliating sheet;

pasting the flexible sheet member to at least one of the base edge portion of the first opening and the base edge portion of the second opening;

separating and removing the auxiliary piece from the dust excluding packing, so that only the dust excluding packing is left; and pasting at least one of the display and the lens barrel to the dust excluding packing.

11. The method of integrating a dust excluding packing to a cabinet according to claim 10, exfoliating the first dust excluding packing of the dust excluding packing sheet according to claim 4 from the exfoliating sheet along with the first auxiliary piece;

separating and removing the first auxiliary piece from the first dust excluding packing, so that only the first dust excluding packing is left; and pasting the display to the first dust excluding packing;

exfoliating the second dust excluding packing of the dust excluding packing sheet according to claim 4 from the exfoliating sheet along with the second auxiliary piece;

pasting the second dust excluding packing to the base edge portion of the second opening, separating and removing the second auxiliary piece from the second dust excluding packing so that only the second dust excluding packing is left; and pasting the lens barrel to the second dust excluding packing.

* * * * *